United States Patent [19]

Spitzer et al.

[11] Patent Number: 5,716,029
[45] Date of Patent: Feb. 10, 1998

[54] CONSTANT SUN ANGLE TRANSFER ORBIT SEQUENCE AND METHOD USING ELECTRIC PROPULSION

[75] Inventors: Arnon Spitzer, Los Angeles, Calif.; Solomon A. De Picciotto, Aurora, Colo.

[73] Assignee: Hughes Electronics, Los Angeles, Calif.

[21] Appl. No.: 558,572

[22] Filed: Oct. 31, 1995

Related U.S. Application Data

[63] Continuation-in-part of Ser. No. 217,791, Mar. 25, 1994, Pat. No. 5,595,360.

[51] Int. Cl.$^6$ ............................................. B64G 1/10
[52] U.S. Cl. ............................................. 244/158 R
[58] Field of Search ............................ 244/158 R, 164, 244/168, 169, 172

[56] References Cited

U.S. PATENT DOCUMENTS 4,943,014  7/1990  Harwood et al. .................... 244/169

FOREIGN PATENT DOCUMENTS 0 047 211   3/1982  European Pat. Off. .
WO 88/02332  4/1988  European Pat. Off. .

OTHER PUBLICATIONS

Porte et al. "Benefits of Electric Propulsion For Orbit Injection of Communication Spacecraft", 14th AIAA International Communication Satellite Systems Conference and Exhibit, 26 Mar. 1992, pp. 1-9.

Meserole, J., "Launch Costs to GEO Using Solar Powered Orbit Transfer Vehicles", American Institute of Aeronautics and Astronautic (AIAA) Paper 93-2219, AIAA/SAE/ASME/ASEE 29th Joint Propulsion Conference and Exhibit, Jun. 28-30, 1993.

Free, B. "High Altitude Orbit Raising With On-Board Electric Power", International Electric Propulsion Conference Paper 93-205, American Institute Of Aeronautics and Astronautics AIAA/AIDA/DGLA/JSASS 23rd International Electric Propulsion Conference, Sep. 13-16, 1993.

*Primary Examiner*—Galen L. Barefoot
*Attorney, Agent, or Firm*—Elizabeth E. Leitereg; Terje Gudmestad; Wanda K. Denson-Low

[57] ABSTRACT

An apparatus and method for translating a spacecraft (102, 108) from an injection orbit (114) about a central body (100) to synchronous orbit (122) in a time efficient manner. The spacecraft (102, 108) includes propulsion thrusters (50) which are fired in predetermined timing sequences controlled by a controller (64) in relation to the apogee (118) and perigee (120) of the injection orbit (114) and successive transfer orbits (114). During transfer orbit, the spacecraft's inertial attitude is adjusted to track sun movement. The spacecraft is injected into a particular injection orbit that offsets moments created by tracking sun movement to maintain stable transfer orbits.

16 Claims, 8 Drawing Sheets

CONSTANT SUN ANGLE TRANSFER ORBIT SEQUENCE AND METHOD USING ELECTRIC PROPULSION

RELATED APPLICATION

This Application is a continuation-in-part of application Ser. No. 08/217,791 filed Mar. 25, 1994, now U.S. Pat. No. 5,595,360.

BACKGROUND OF THE INVENTION

1. Field of the Invention

This invention relates to an apparatus and method of translating a spacecraft from a particular injection orbit to a synchronous orbit in a time efficient manner while maintaining a constant sun angle to improve power efficiency and allow spin stabilization control.

2. Description of the Related Art

In order to place a spacecraft into a final orbit, such as a geosynchronous orbit, about a central body, such as the earth, the spacecraft is first launched into an injection orbit by the spacecraft launch vehicle. From this injection orbit, the spacecraft is translated through a series of orbits to the geosynchronous orbit. In order for the spacecraft to translate from its injection orbit to the geosynchronous orbit, propulsion thrusters fire to exert a force on the spacecraft and move it through the transfer orbit.

There are a number of strategies for translating a spacecraft from its injection orbit to geosynchronous orbit. In a first strategy, a launch vehicle injects the spacecraft to an elliptical orbit having an apogee greater than the geosynchronous orbit, defined as a supersynchronous orbit. Once the spacecraft has reached supersynchronous orbit, propulsion thrusters are fired when the spacecraft is in a predetermined orientation and in proximity to apogee or perigee. Firing the propulsion thrusters at apogee to create thrust in the direction of orbital velocity raises perigee, and firing the propulsion thrusters at perigee to create thrust in a direction opposite the orbital velocity lowers apogee. These apogee and perigee firings or burns translate the spacecraft from supersynchronous orbit to geosynchronous orbit. In a second strategy, the spacecraft is injected into an elliptical orbit having an apogee less than the geosynchronous, defined as a subsynchronous orbit. Once the spacecraft is in subsynchronous orbit, the propulsion thrusters are once again fired when the spacecraft in proximity to apogee and perigee and in a predetermined orientation. Firing at apogee to create thrust in the direction of orbital velocity raises perigee, and firing at perigee to create thrust in the direction of orbital velocity raises apogee. The apogee and perigee bums cause the spacecraft orbit to spiral out to the geosynchronous orbit. Such a spiraling-out mission using a specific type of thruster is described in Meserole, J. "Launch Costs to GEO Using Solar Powered Orbit Transfer Vehicles." *American institute of Aeronautics and Astronautics (AIAA) Paper* 93-2219, AIAA/SAE/ASME/ASEE 29th Joint Propulsion Conference and Exhibit (Jun. 28–30, 1993).

European Publication No. 0 047 211 to Mortelette describes a transfer orbit strategy in which the spacecraft is injected in a natural orbit where the apogee equals the semi-major axis of the desired geosynchronous orbit and the perigee is much smaller than the semi-major axis. The spacecraft applies thrust symmetrically about apogee for approximately half the period of the orbit, to increase perigee to the semi-major axis while leaving apogee unchanged. The spacecraft's attitude changes constantly to remain aligned with the velocity vector in order to provide maximum thrust. Because the launch vehicle injects the spacecraft into either a subsynchronous or supersynchronous orbit, the spacecraft must include its own propulsion system to effect a translation from injection to geosynchronous orbit and to perform orientation and other stationkeeping maneuvers. This raises several considerations for selecting a particular injection orbit translation strategy. Ideally, an injection orbit is selected so that the weight of the spacecraft without fuel, the dry weight, is maximized. The dry weight generally includes the weight of the instrumentation and the underlying spacecraft structure for the instrumentation. Optimizing dry weight requires a trade-off between the capability of the launch vehicle, how high above the earth the spacecraft can be launched, and the propulsion system of the spacecraft, the on-board thrusters and fuel carried by the spacecraft to translate from injection orbit to geosynchronous orbit and perform stationkeeping maneuvers. Greater injection orbits, i.e., higher apogees, reduce the amount of propellant expended by the spacecraft propulsion system to achieve geosynchronous orbit. On the other hand, the capability or payload capacity of the launch vehicle decreases with an increase in the targeted apogee altitude, so that a more powerful launch vehicle is required to inject a spacecraft having the same mass to an injection orbit having a higher apogee. Thus, in order to optimize the weight of the spacecraft at arrival in geosynchronous orbit, defined as the beginning of life weight (BOL), there is a trade-off between the capability of the launch vehicle and the amount that the propulsion thrusters need to be fired. Of course, the more that the propulsion thrusters are fired, more propellant mass is required, leaving less mass allocated to useful instrumentation.

Further adding to the above considerations is that there are two types of spacecraft propulsion thrusters, electric and chemical. Chemical propulsion thrusters provide the required thrust for translating the spacecraft from injection orbit to geosynchronous orbit and are capable of exerting a substantial force on the spacecraft. However, chemical propulsion thrusters expend a great deal of mass (propellant) in achieving a predetermined orbit orientation. Electric propulsion thrusters, on the other hand, create significantly less thrust than the-chemical propulsion thrusters, but they expend much less mass (propellant) in doing so. That is, electric propulsion thrusters use propellant (mass) much more efficiently than chemical propulsion thrusters. Using electric and chemical propulsion thrusters to effect translation from injection orbit to geosynchronous orbit is described in Forte, P. "Benefits of Electric Propulsion for Orbit Injection of Communication Spacecraft." *American Institute of Aeronautics and Astronautics (AIAA) Paper* 92–1955, 14th AIAA International Communication Satellite Systems Conference & Exhibit (Mar. 22–26, 1992). A combined electric and chemical propulsion system is also described in Free, B. "High Altitude Orbit Raising with On-Board Electric Power." *International Electric Propulsion Conference Paper* 93–205, American Institute of Aeronautics and Astronautics (AIAA)/AIDA/DGL A/JSASS 23rd International Electric Propulsion Conference (Sept. 13–16, 1993).

Because chemical propulsion thrusters exert a much higher force than electric propulsion thrusters, they enable translation from injection orbit to geosynchronous orbit in a substantially shorter period of time than electric propulsion thrusters. Furthermore, current transfer orbit strategies for translating a spacecraft from injection orbit to geosynchronous orbit fail to describe a viable burn strategy using electric propulsion thrusters exclusively to translate the spacecraft to geosynchronous orbit. Moreover, substitution of electric propulsion thrusters in chemical propulsion thrusters transfer orbit strategies would require an unacceptable transfer orbit duration (TOD).

Electric propulsion thrusters also introduce yet another consideration, that of stationkeeping and maneuvering. Because electric propulsion thrusters expend substantially less propellant for a given thrust than chemical propulsion thrusters, and that thrust is relatively low compared to chemical propulsion thrusters, they are more desirable for stationkeeping and on-station maneuvers. Because stationkeeping maneuvers require minimal thrust to reposition the spacecraft, electric propulsion thrusters perform stationkeeping using much less mass (propellant) than chemical propulsion thrusters.

The trade-off remains that by using chemical propulsion systems and chemical transfer orbit strategies to achieve geosynchronous orbit, a substantial portion of the spacecraft mass is allocated to propellant for the chemical thrusters. This mass may be traded into a decreased required launch vehicle capability, or, alternatively, traded for increased payload for the same launch vehicle capability or a combination thereof. Yet electric propulsion thrusters in combination with chemical propulsion transfer orbit strategies provide an unacceptably long transfer orbit duration. Thus, it is desirable to provide a transfer orbit apparatus and strategy using electric propulsion thrusters which provides acceptable transfer orbit duration for a given launch vehicle capability and a given payload.

SUMMARY OF THE INVENTION

The invention provides a spacecraft and method for translating the spacecraft launched into an injection orbit about a central body and oriented in an inertial attitude to a synchronous orbit having a semi-major axis and a predetermined orbital plane. The apparatus includes a propulsion thruster oriented on the spacecraft to generate a thrust having a predetermined force on the spacecraft. The apparatus further includes a controller for controlling the timing of firing the propulsion thruster.

The controller fires the propulsion thruster at apogees of intermediate orbits to successively increase the perigees thereof until the semi-major axis of an intermediate orbit is substantially equal to the semi-major axis of the synchronous orbit, thereby defining an initial transfer orbit for the spacecraft. The controller thereafter continuously fires the propulsion thruster to translate the orbit of the spacecraft from the initial transfer orbit to the synchronous orbit while maintaining the substantial equality of the synchronous semi-major axis and the transfer orbit semi-major axis.

The spacecraft is injected into a particular orbit and its inertial attitude is adjusted to maintain a desired orientation with respect to the sun. The otherwise unstable injection orbit is selected to offset the moments created by adjusting the spacecraft's attitude thereby maintaining a stable orbit. The maintenance of a constant sun angle is particularly applicable to spinner satellites and 3-axis cubic satellites in a spin stabilized mode.

The various advantages of the present invention will become apparent to one skilled in the art by reading the following specification and by reference to the following drawing in which:

DETAILED DESCRIPTION OF THE PREFERRED EMBODIMENTS

Figure 1:
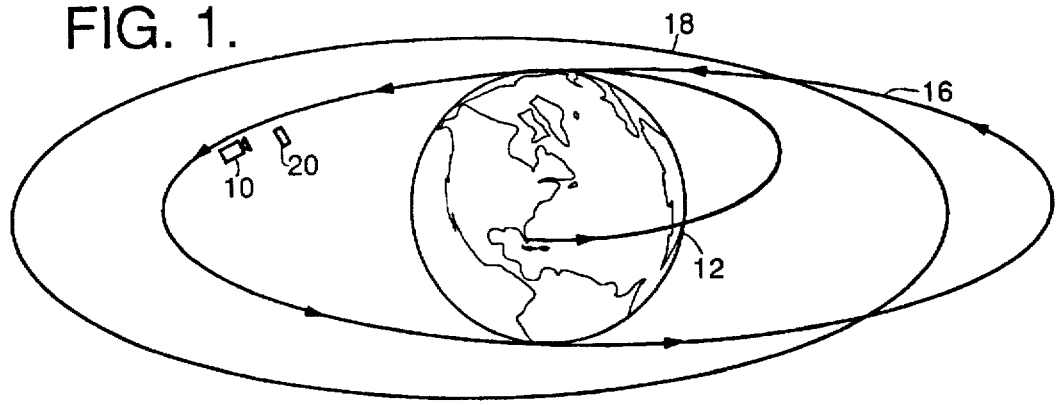
FIG. 1 illustrates a typical injection sequence for launching a spacecraft from ground zero to an injection orbit.

The following description of the preferred embodiments is merely exemplary in nature and not intended to limit the invention or its application or uses. In this specification, note that elements having similar structures or functions will be referred to using like reference numerals.

Referring to FIG. 1, a spacecraft 10 launched from a position on the earth 12 follows a path predetermined in accordance with parameters of the launch vehicle and settles into an elliptical orbit defined as the injection orbit 16. The optimal transfer orbit trajectory mechanism and apparatus will describe how to translate the spacecraft 10 from the injection orbit 16 to a a final orbit 18, shown here as a geosynchronous orbit. During the launch sequence, the spacecraft 10 separates from first, intermediate, and final stages as shown at reference numeral 20 before reaching injection orbit 16. The number of stages from which spacecraft 10 separates during launch to injection orbit 16, depends upon the parameters, capabilities, and particular application for the launch vehicle. Such parameters, capabilities, and applications vary widely, but are well known to someone skilled in the art.

Figure 2:
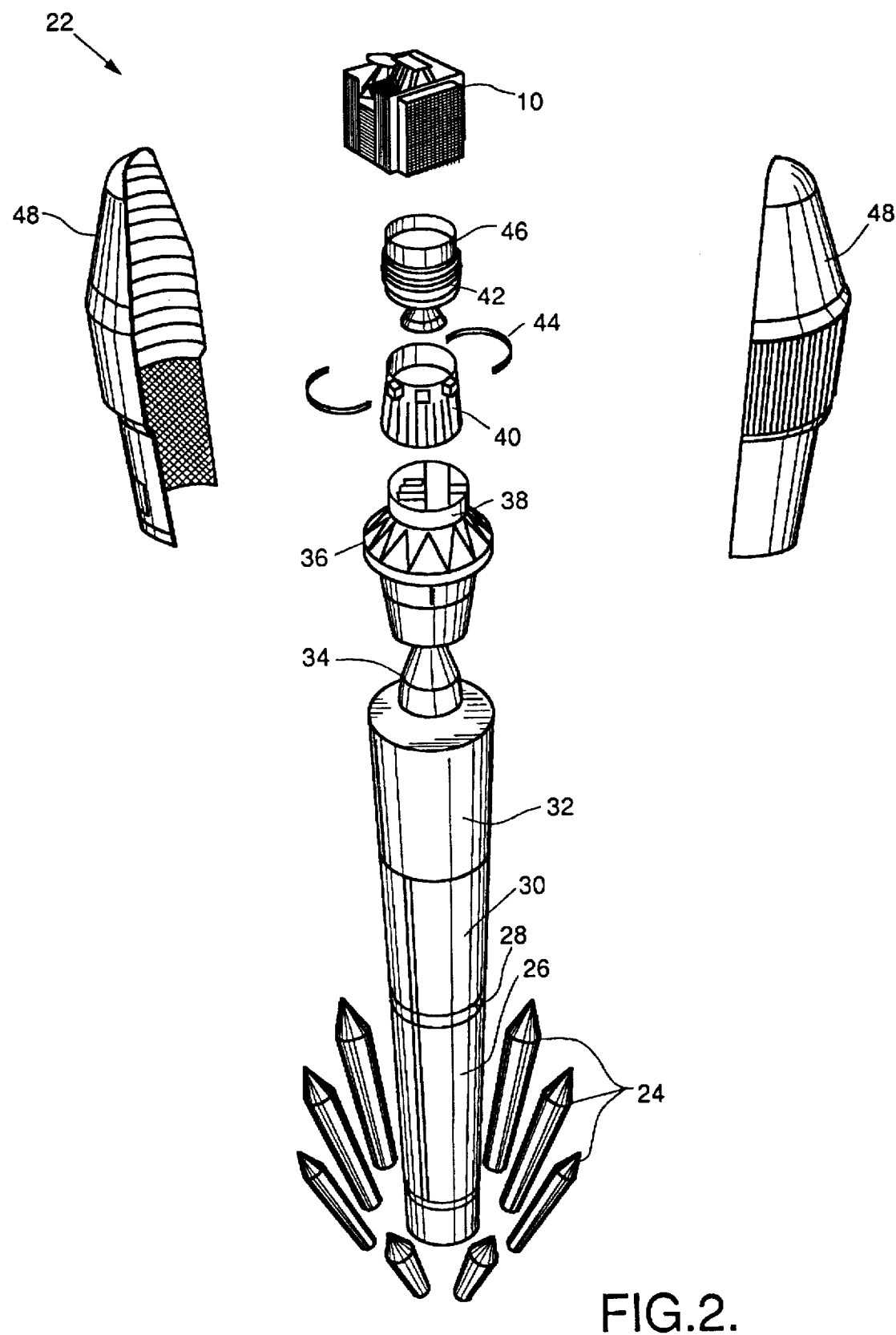
FIG. 2 is a partial exploded view and a partial perspective view of a launch vehicle.

Referring to FIG. 2, the spacecraft 10 is shown with other component parts which comprise launch vehicle 22. Launch vehicle 22 shown in FIG. 2 is commonly referred to as a DELTA 7925 launch vehicle and is merely exemplary of one of a number of launch vehicles well known to one skilled in the art. The component parts of launch vehicle 22 include thrust augmentation solids 24, first stage oxidizer tank 26, center body 28, and fuel tank 30 all of which comprise the first stage of launch vehicle 22. Fuel from fuel tank 30 and reactants from thrust augmentation solids 24 introduced into first stage oxidizer 26 chemically react to yield energy manifested as a thrusting force propelling launch vehicle 22. Interstage 32 links fuel tank 30 to second stage 34 and also provides additional propulsion. Second stage 34 includes truss 36 for supporting guidance electronics 38. Guidance electronics 38 attaches to spin table 40 which in turn attaches to third stage motor 42 via clamp bands 44. Third stage motor 42 attaches to spacecraft 10 via attached fitting 46. During launch, fairings 48 provide protection for second stage 34, third stage motor 42, spacecraft 10 and the various associated components therewith. After launch vehicle separation 20 of FIG. 1, only spacecraft 10 continues to injection orbit 16.

In operation, launch vehicle 22 is supported on a launch pad (not shown) on the earth 12 and loaded with the appropriate fuels and instrumentation in preparation for lift-off. At lift-off, first stage components 24–30 operate as described above and provide initial thrust to propel launch vehicle 22 off of the launch pad. At a predetermined time in the launch sequence the first stage will detach, at which time interstage 32 activates to provide thrust. Similarly, interstage 32, second stage 34, and third stage 42 will provide thrust, then detach from the remainder of launch vehicle 22. Also at a predetermined time, the fairings 48 will open, exposing second stage 34, third stage 42, and spacecraft 10. Eventually, after all components have separated from launch vehicle 22, only spacecraft 10 remains and continues to injection orbit 16. Note that the above described launch vehicle 22 and launch sequence are merely exemplary, and it should be readily recognized by one skilled in the art that the invention described herein is equally applicable any of a number of various launch vehicles and launch sequences.

Figure 3:
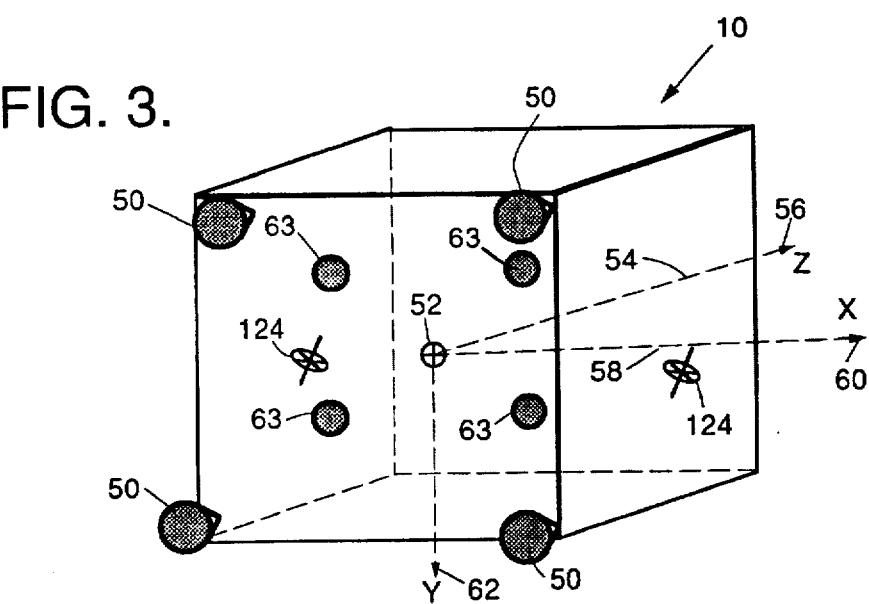
FIG. 3 depicts a spacecraft as shown in FIG. 2 having mounted thereon electric propulsion thrusters for effecting translation of the spacecraft to geosynchronous orbit and for performing stationkeeping functions.

Referring to FIG. 3, a thruster positioning diagram of spacecraft 10 is shown. Spacecraft 10 may be one of any of a number of shapes and sizes well known in the art, which typically depends upon the particular application for which the spacecraft is to be used. Spacecraft 10 has a center of mass 52 through which passes three axes, a Z axis 54, an X axis 58, and a Y axis 60. The Z axis 54, X axis 58, and Y axis 60 are shown extending in a positive direction in accordance with arrows 56, 60, and 62, respectively. Spacecraft 50 includes electric propulsion thrusters 50 arranged so that when activated, spacecraft 10 experiences a force in the positive direction of Z axis 54. Electric propulsion thrusters 50 may optionally be canted so the thrust vector of any particular electric propulsion thruster 50 is slightly off parallel from the positive Z axis in order to provide redundant directional thrust for use as a backup, secondary attitude control system. However, the resultant thrust vector when all electric propulsion thrusters fire preferably parallels positive Z axis 54.

Additional electric propulsion thrusters 63 primarily provide thrust for performing attitude control and stationkeeping of spacecraft 10. Attitude control can also be accomplished with momentum wheels 124, which include gyros with a programmable spin rate. Typically, electric propulsion thrusters 63 are smaller and provide less thrust than electric propulsion thrusters 50 because they only need exert relatively small forces to carry out relatively minor spacecraft positioning adjustments. Propulsion thrusters 63 are shown mounted on the same panel as propulsion thrusters 50, and are canted so that individually they exert thrust inwardly towards center of mass 52. Electric propulsion thrusters 50 are preferably either xenon-ion-propulsion-thrusters (XIPS) or arcjet propulsion thrusters.

Propulsion thrusters 50 and propulsion thrusters 63 are preferably electric propulsion thrusters, and are referred to accordingly throughout this specification. However, it should be obvious to one skilled in the art that one or a number of propulsion thrusters 50 and/or 63 may be replaced chemical propulsion thrusters, particularly if the chemical propulsion thruster has properties similar to electric propulsion thrusters. As noted above, electric propulsion thrusters provide much lower thrust than chemical propulsion thrusters, but deplete significantly less mass for an equivalent period of thruster activation.

Figure 4:
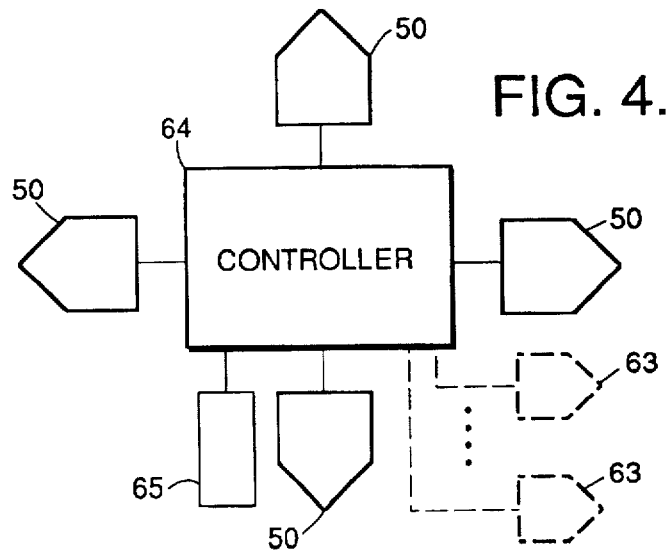
FIG. 4 illustrates generally the controller portion of the spacecraft for operating the electric propulsion thrusters for translation to geosynchronous orbit.

Referring to FIG. 4, controller 64 selectively activates electric propulsion thrusters 50 in accordance with a predetermined fire control routine. Controller 64 may optionally control the firing of electric thrusters 63 or the spin rate of momentum wheels 124 to provide attitude control. In operation, controller 64 receives input information from sensor block 65 and determines if electric propulsion thrusters 50 should be activated. Sensor block 65 provides input data such as attitude, orientation, and position with respect to earth 12. Controller 64 evaluates such information and generates appropriate fire control signals responsive to the received information. Controller 64 may also optionally control other spacecraft functions and operate as an integrated spacecraft controller. Furthermore, controller 64 may provide other than simply firing sequences for transfer orbit propulsion thrusters 50. For example, controller 64 may effect communication between spacecraft 10 control systems, may communicate with ground or space based receivers-transmitters, or may control other instrumentation as required by the particular application.

Figure 5:
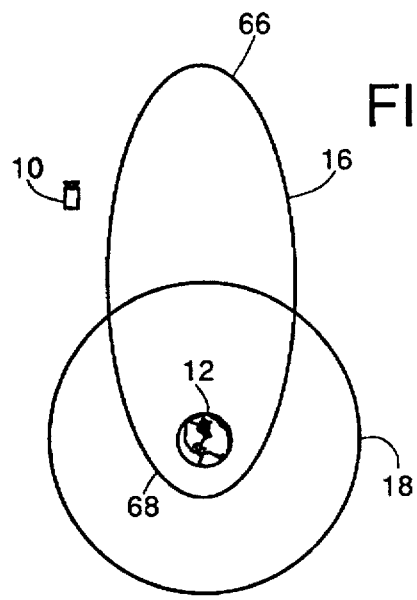
FIG. 5 depicts the spacecraft at injection orbit around a central body and geosynchronous orbit about the central body.

FIGS. 5–9 depict a transfer orbit trajectory sequence of spacecraft 10 from injection orbit 16 to geosynchronous orbit 18. As noted above, like reference numerals will be used to describe similar elements to those already previously described. Referring to FIG. 5, spacecraft 10 is shown in injection orbit 16 orbiting around a central body such as the earth 12. Geosynchronous orbit 18 is also depicted in FIG. 5. Injection orbit 16 is an elliptical orbit having an apogee 66 and a perigee 68 which are defined as the highest and lowest points, respectively, of the elliptical orbit with respect to earth 12. It will be recognized by one skilled in the art that injection orbit 16 is attained in accordance with a number of predetermined application parameters. Specifically, the speed of spacecraft 10 at perigee 68 and the height of perigee 68 define the height of apogee 66 and the eccentricity of tie elliptical injection orbit 16. Furthermore, to reduce eclipse the orbit's perigee is preferably positioned behind the earth with respect to the sun.

Figure 6:
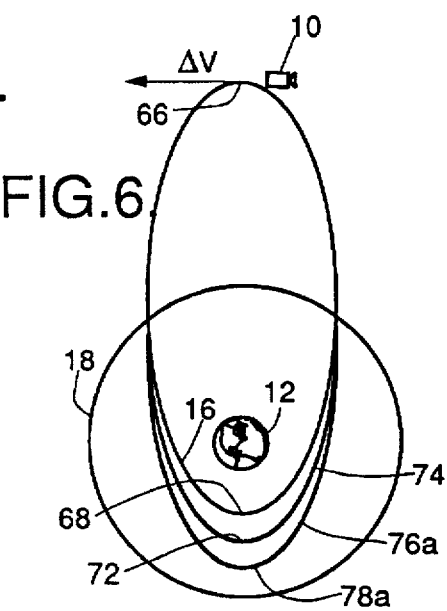
FIG. 6 depicts the spacecraft in a supersynchronous orbit about a central body during an apogee burn to raise perigee.

Referring to FIG. 6, spacecraft 10 is shown in proximity to apogee 66 of an intermediate orbit 74 having an elliptical shape. When spacecraft 10 is oriented in a predetermined attitude and direction using any of a number of methods known to one skilled in the art, controller 64 activates electric propulsion thrusters 50 causing a change in velocity vector ΔV and raising perigee to a new perigee 72 of a new intermediate elliptical orbit 74. The change in velocity vector ΔV substantially points orthogonally to a line between apogee and perigee in the direction that spacecraft 10 travels when at apogee 66. Firing propulsion thrusters 50 of spacecraft. 10 during consecutive passes around apogee 66 raises the perigee 72 of each successive intermediate orbit 74. Intermediate orbit 74 has the same apogee 66, but has an increased perigee 72 and decreased eccentricity. Note again that intermediate orbit 74 of FIG. 6 represents a number of intermediate orbits resulting from successive firings of electric propulsion thrusters 50 at apogee 66 to exert a change in velocity ΔV, resulting in successive intermediate orbits 74 having successively increasing perigees 72 and decreasing eccentricity. In addition to raising perigee 72, firing the electric thrusters 50 around apogee 66 also results in an increase in the semi-major axis, defined as the average of the apogee and perigee, of the orbit of spacecraft 10. The semi-major axis is raised to be substantially equivalent to the semi-major axis of geosynchronous orbit 18, which in accordance with the laws of physics, necessarily implies that the orbital periods of both the geosynchronous orbit 18 (24 hours by definition) and transfer orbit 74 are substantially equivalent as well.

Firing electric thrusters 50 at apogee 66 after the spacecraft has been placed in the desired burn attitude has two effects. First, as described above, firing electrical propulsion thrusters 50 at apogee 66 raises perigee 72. Second, referring to FIG. 7, firing electric propulsion thrusters 50 at apogee 66 also enables adjustment of the angle of inclination 73 of the orbital plane 75 of injection orbit 16 with respect to the geosynchronous plane 77. Because the angle of inclination 73 of injection orbit 16 can be no lower in degrees than the latitude from which spacecraft 10 was launched, adjustment may be necessary. In order to adjust the angle of inclination 73 (to the geosynchronous plane 77, for example), it is necessary to incline spacecraft 10 to an attitude so that Z axis 56 does not parallel the plane defined by transfer orbit 74 and points in the direction of geosynchronous plane 77. When this occurs, the angle of inclination 73 of the orbital plane 75 of intermediate orbit 74 changes as electric propulsion thrusters 50 fire. As described above with respect to intermediate orbit 74, there are a number of successive intermediate orbital planes 75a–b and angles of inclinations 73a–b through which spacecraft 10 translates while the angle of inclination 73 is reduced so that orbital plane 75 and geosynchronous plane 77 substantially coincide.

Firing at such a supersynchronous orbit yields the added benefit that the supersynchronicity of the orbit provides a longer burn for raising perigee 72 and decreasing the angle of inclination 73 than for a less supersynchronous orbit. For example, in a subsynchronous orbit, a perigee raising burn may last six out of 10 hours versus nineteen out of 22 hours for a supersynchronous orbit. Accordingly, the time of the burn for rasing perigee 72 lasts longer and raises perigee 72 faster.

Figure 7:
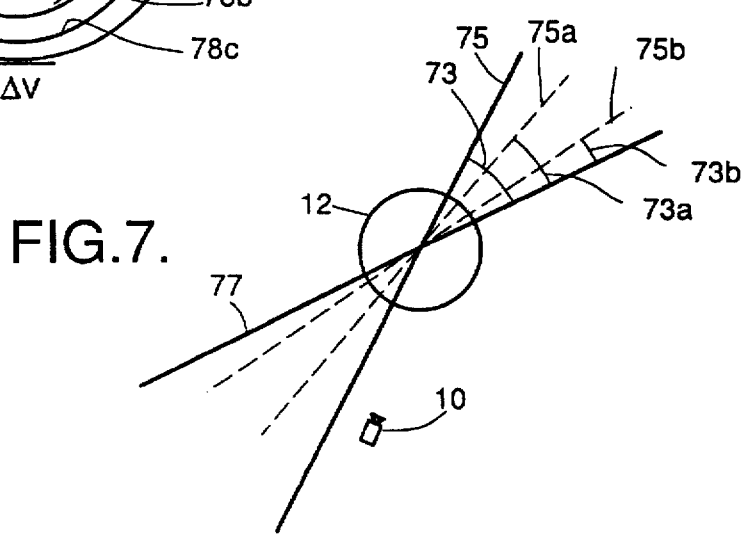
FIG. 7 depicts the angle of inclination between the geosynchronous orbit and an orbit followed by the spacecraft.

Referring to FIG. 7, during the above described process of raising perigee 72, the angle of inclination 73 between the plane 75 defined by the orbit followed by the spacecraft (orbit 74 in FIG. 6) and the geosynchronous plane 77 is adjusted. Spacecraft 10 follows orbit 74, and while the direction of thrust primarily points in the direction of the change in velocity ΔV lying within orbital plane 75, it is also directed out of parallel from orbital plane 75 to sufficiently decrease the angle of inclination 73. Ideally the rate of change of the angle of inclination 73 and of the increase of perigee 72 is such that the angle of inclination 73 reaches zero degrees and perigee 72 reaches the semi-major axis of the geosynchronous orbit 16 at substantially the same time. As described further herein below, when the angle of inclination 73 approaches zero degrees, the attitude of the spacecraft is reoriented so that the change in velocity ΔV is substantially parallel to the orbital plane 75 which will then be substantially coincident with geosynchronous plane 77.

Figure 8:
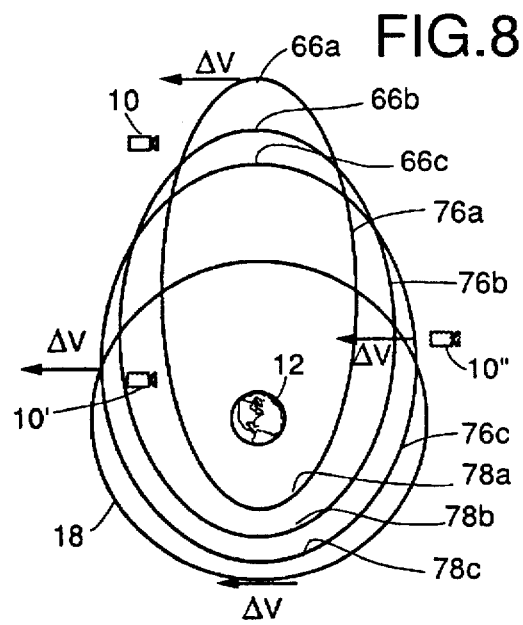
FIG. 8 depicts the spacecraft in a series of intermediate orbits about a central body during a continuous firing sequence.
Figure 9:
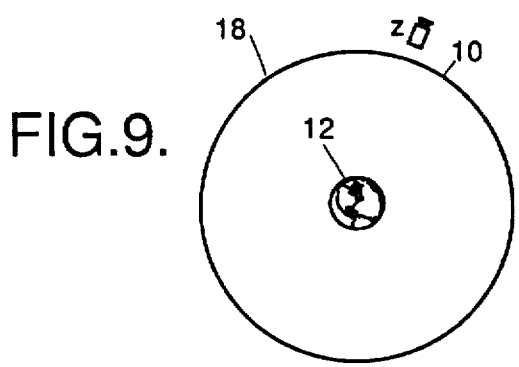
FIG. 9 depicts the spacecraft having reached geosynchronous orbit.

In FIG. 8, after perigee 72 of transfer orbit 74 has been raised to the predetermined level 78a or orbit 76a, spacecraft 10 oriented so that when controller 64 activates propulsion thrusters 50 a thrust parallel to ΔV as shown in FIG. 8 results along the positive Z axis 54. Spacecraft 10 remains in this predetermined orientation while orbiting around the earth 12, and also remains in a substantially fixed attitude so that the positive Z-axis and ΔV are substantially parallel to orbital plane 76a. Controller 64 fires electric propulsion thrusters 50 around the entirety of intermediate orbits 76a, 76b, and 76c. This continuous firing has two effects on transfer orbits 76a–c. First, each succeeding transfer orbit 76a to 76b and 76b to 76c has a progressively higher perigee 78a–c and a progressively lower apogee 66a–c. Second, at the same time, the eccentricity of the successive orbital ellipses 78a–d decreases as spacecraft 10 approaches the eccentricity of geosynchronous orbit 18. The 100% duty cycle produces a faster circularization compared to the much lower duty for GeoStation Transfer Orbit (GTO) sequences. The higher specific impulse of the electric propulsion thrusters means that the ΔV inefficiency has a relatively small mass impact. Once in geosynchronous orbit 18 as shown in FIG. 9, the spacecraft 10 may be reoriented into an operational orientation. For example, as shown in FIG. 9, spacecraft 10 is positioned with positive the Z axis 54 oriented towards the earth 12.

Figure 10:
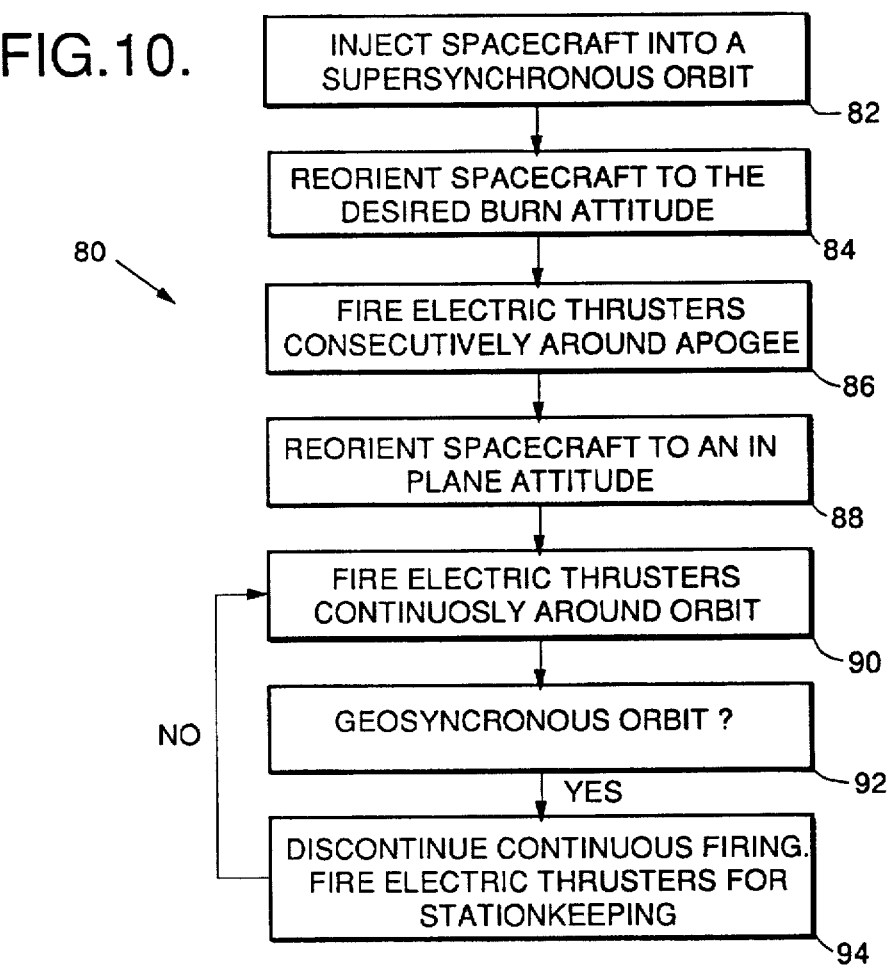
FIG. 10 is a flow diagram of a sequence implemented by the controller for firing the electric propulsion thrusters to reach geosynchronous orbit.

Referring to FIG. 10, a flow chart depicting the steps carried out by controller 62 for translating spacecraft 10 from injection orbit 16 to geosynchronous orbit 18 is shown and will be referred to generally as flow chart 80. At block 82, the launch vehicle 22 of FIG. 2 injects spacecraft 10 into a supersynchronous orbit 16 as depicted in FIG. 5. At block 84, the spacecraft 10 is reoriented to the desired burn attitude so that when electric propulsion thrusters 50 are activated, the resulting ΔV points in the desired direction. This reorientation maneuver is typically performed using attitude control propulsion thrusters 62. Control then passes to block 86 where the electric propulsion thrusters 50 are fired during consecutive passes around apogee 66 of transfer orbit 74 of FIG. 6. In block 86, firing propulsion thrusters 50 raises perigee 72 and may also adjust the angle of inclination 73. Once the orbital plane is properly adjusted as described with respect to FIGS. 6 and 7, the spacecraft is reoriented (if necessary) at block 88 so that Z axis 54 lies parallel to orbital plane 74 and is parallel to ΔV of FIGS. 6.

After reorienting spacecraft 10 to an in-plane attitude, at block 90 controller 64 initiates continuous firing of electric propulsion thrusters 50 as spacecraft 10 orbits around earth 12. Such firing is depicted in FIG. 8, where spacecraft 10 is shown at a number of locations 10, 10' and 10" following intermediate orbits 76a, 76b, and 76c, respectively. This continuous firing results in a continuous raising of perigee 78a–c and a continuous lowering of apogee while maintaining a nearly constant semi-major axis for each of intermediate orbits 76a–d which remains substantially equal to the semi-major axis of geosynchronous orbit 18. Controller 64 maintains continuous activation of electric thrusters 50 until spacecraft 10 has translated to geosynchronous orbit 18. At block 92, controller 64 tests whether geosynchronous orbit has been achieved. Once spacecraft 10 achieves geosynchronous orbit, block 92 passes control to block 94 where controller 64 discontinues firing of electric propulsion thrusters 50. Thereafter, electric propulsion thrusters 50 may be fired as necessary for stationkeeping and other maneuvers.

Figure 11:
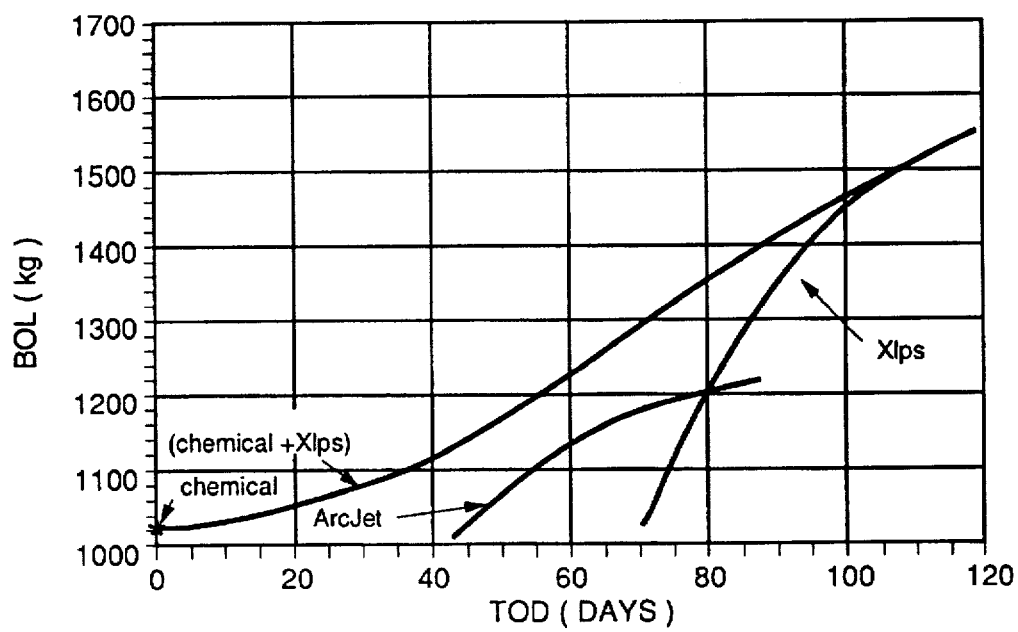
FIG. 11 is a graph of the transfer orbit duration of a spacecraft to geosynchronous orbit versus the weight of the spacecraft delivered to geosynchronous orbit for various transfer orbit propulsion systems.

As noted above with respect to FIG. 3, electric propulsion thrusters 50 and 62 described herein may be embodied as, but need not be limited to, either XIPS or arcjet electric propulsion systems. Alternatively, as also noted above, electric propulsion thrusters 50 and 62 may be embodied as a hybrid or complete chemical propulsion system. Referring to FIG. 11, a graph depicts selected performance characteristics of the XIPS and arcjet implementations of electric propulsion thrusters 50 and 62 as well as a hybrid of the XIPS and a chemical propulsion system. In the graph, the ordinate, depicts the transfer orbit duration (TOD) in days and the abscissa depicts beginning of life weight (BOL) in kilograms. As can be seen from the graph of FIG. 11, while the chemical propulsion system has a very short transfer orbit duration, a great expense is incurred in terms of the beginning of life weight. This implies that a spacecraft can be put into geosynchronous orbit rather quickly using chemical propulsion thrusters and chemical transfer orbit strategies, but with much less instrumentation and stationkeeping fuel. On the other hand, the XIPS and arcjet thrusters demonstrate that while the transfer orbit duration is substantially greater than for chemical propulsion thrusters, a much greater beginning of life weight is achieved. This translates into substantially more instrumentation and fuel, which may ultimately increase the life expectancy of the spacecraft 50% or greater. Alternatively, for the same spacecraft mass, a launch vehicle having less capability, and a lower cost, can inject the spacecraft.

Also shown in FIG. 11 is a plot for a hybrid chemical and XIPS system. This system combines features of both chemical and electric propulsion thrusters to both decrease the transfer orbit duration and increase the beginning of life weight. Along this plot, as the TOD increases, a higher proportion of electrical propulsion translates the spacecraft to geosynchronous orbit. As the TOD decreases, a lower proportion of electrical propulsion translates the spacecraft to geosynchronous orbit. It can be seen from this plot that beginning of life weight can be significantly increased by use of the hybrid system.

A significant advantage realized by the method and apparatus described herein is that an equivalent beginning of life weight can be delivered to geosynchronous orbit 18 using much smaller and less expensive launch vehicles. For example, a spacecraft having a beginning of life weight which typically requires launch by an ATLAS or ARIANE 4L booster could be delivered by the much less expensive Delta II booster. By the same token, greater payloads can be delivered by identical launch vehicles if electric propulsion engines translate the spacecraft to geosynchronous orbit. The increased payload can be translated into spacecraft lifetime because electric propulsion requires much less mass for stationkeeping, approximately 6 kilograms per year, compared to chemical propulsion systems, approximately 27 kilograms per year. Further, the time required to achieve geosynchronous orbit has been optimized while utilizing a smaller launch vehicle for the same payload.

Figure 12:
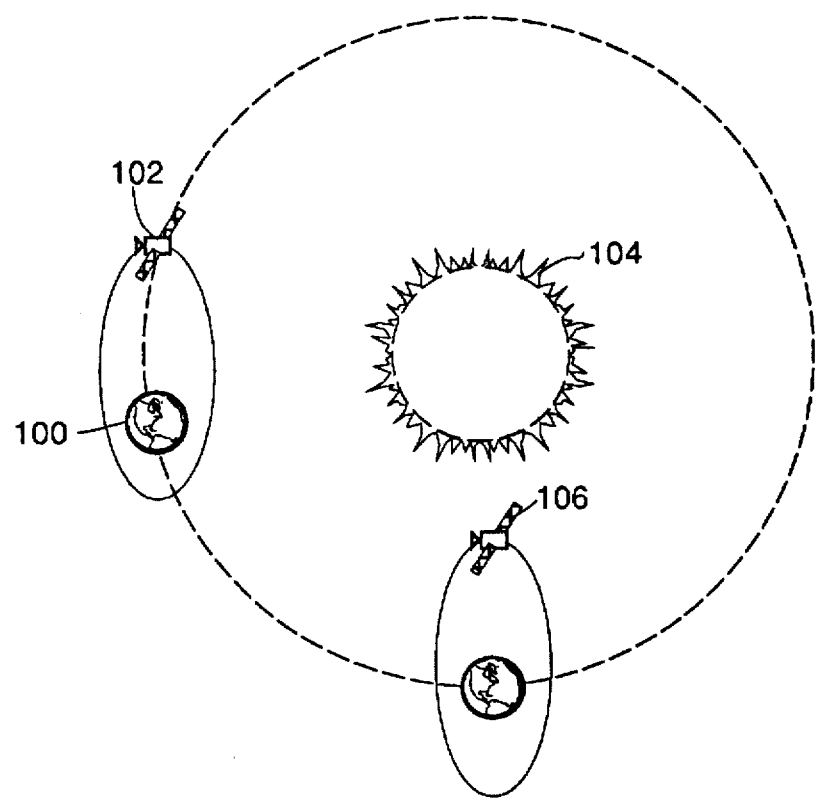
FIG. 12 depicts a 3-axis cubic satellite with an inertially fixed attitude orbiting around the earth and sun.

FIG. 12 depicts a 3-axis cubic satellite 102 orbiting the earth 100, which in turn orbits the sun 104 for the orbit transfer sequence shown in FIGS. 5–9. The satellite 102 is injected into a naturally stable orbit with perigee positioned behind the earth. This reduces the duration of the eclipse caused by the earth coming between the sun and the satellite. The satellite has a fixed inertial attitude in line with the velocity vector at apogee so that thrust at apogee increases perigee and thrust at perigee reduces apogee. As the earth moves around the sun, the orientation between the satellite and the sun changes at approximately 1° per day. Thus, to maintain a high and uniform power level, the satellite's solar panels 106 are rotated so that they always face the sun.

Figure 13:
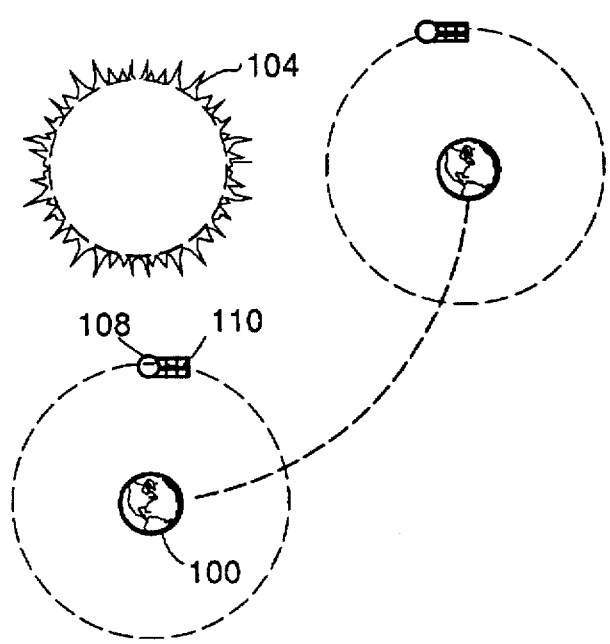
FIG. 13 depicts a spinner satellite with an inertially fixed attitude orbiting around the earth and sun.

A spinner 108 is typically a cylindrical satellite having solar panels 110 affixed to its outer surface, but not to either of its ends. The spinner 108 spins around its central axis 110, and thus is spin stabilized. It is well known in the art that spin stabilization reduces the complexity of maintaining an inertial attitude. Unlike the 3-axis cubic satellite, the spinner's solar panels are fixed and thus can not be independently rotated to follow the sun. Furthermore, the spinner's solar panel surface area at a given orientation to the sun is much less than that of a 3-axis cubic satellite. As shown in FIG. 13, as the earth moves around the sun, the orientation of the spinner's solar panels to the sun would change by about 1° per day, and consequently the power produced by the panels would be reduced. After approximately 20 days, the power produced would be insufficient to power the satellite. Because the transfer orbits associated with electrical propulsion typically take between 30 and 90 days, this strategy can not be used with spinners. As a result, spinners are currently transferred to their final orbits using chemical propulsion.

Figure 14:
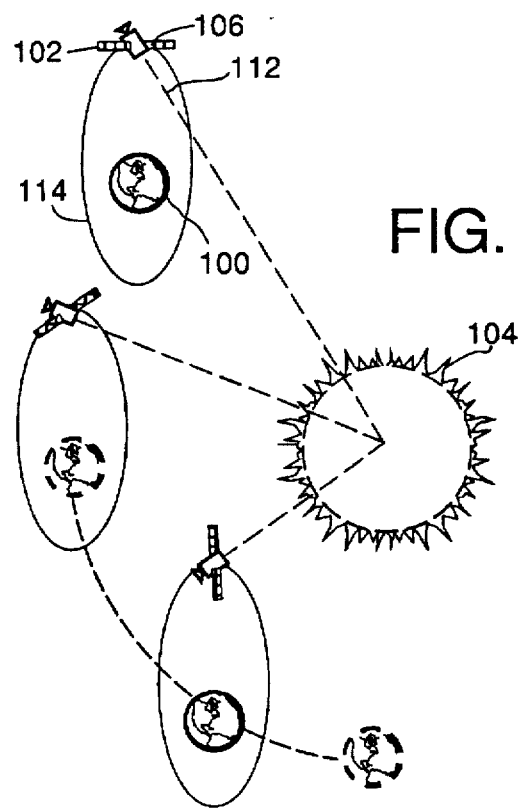
FIG. 14 depicts a 3-axis cubic satellite in a spin stabilized mode whose inertial attitude is synchronized to the sun.
Figure 15:
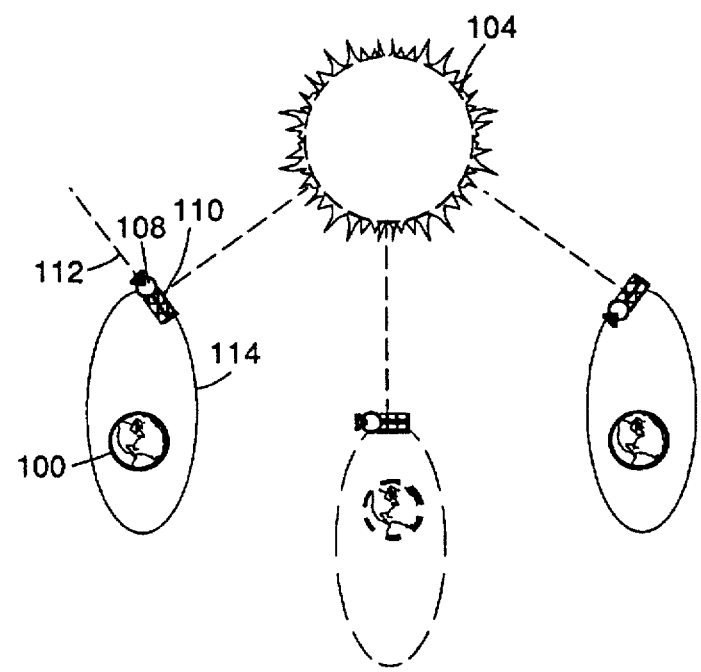
FIG. 15 depicts a spinner satellite whose inertial attitude is synchronized to the sun.

An alternate transfer orbit sequence, as shown in FIGS. 14 and 15, allows the 3-axis cubic satellite to be spin stabilized during transfer and allows spinners to be transferred with an electrical propulsion system. A number of 3-axis cubic and spinner satellites are described in the Hughes Space and Communications Group Brochure, 1989. To accomplish this, the transfer orbit sequence described in FIGS. 5–9 is modified in two ways. First, the inertial attitude 112 of the satellite is adjusted to maintain a desired orientation with respect to the sun so that its solar panels face the sun. Preferably 0° for the cubic satellite and 90° for the spinner. This allows the solar panels on the 3-axis cubic satellite to be deployed in a fixed position, in which the satellite can be spin stabilized. Adjusting the panels while spinning the satellite would create an immense torque that would damage the satellite. Furthermore, adjusting the inertial attitude creates a turning moment that tends to destabilize the transfer orbit. Second, the satellite is injected into a particular orbit 114 to create a moment that offsets the destabilization effects of adjusting the inertial attitude. Together the attitude adjustment and orbit selection provide a stable orbit and a sun, as well as earth, synchronized inertial attitude.

Figure 16A:
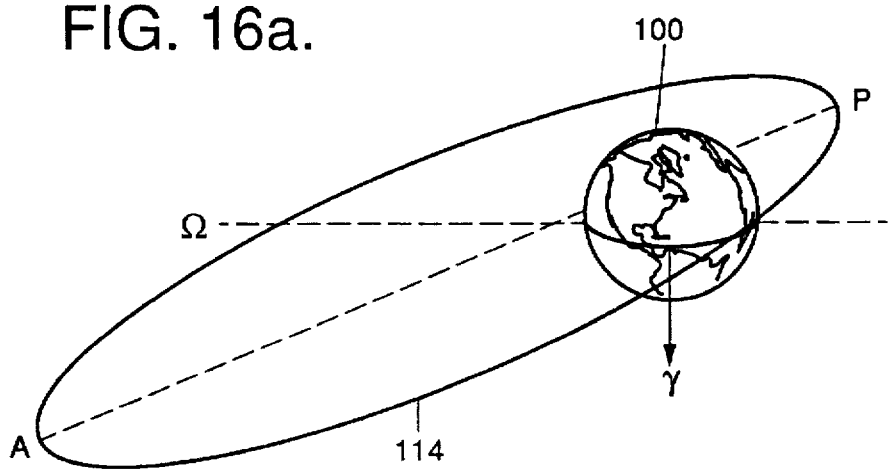
FIGS. 16a and 16b are perspective and plan views, respectively, of a particular injection orbit.
Figure 16B:
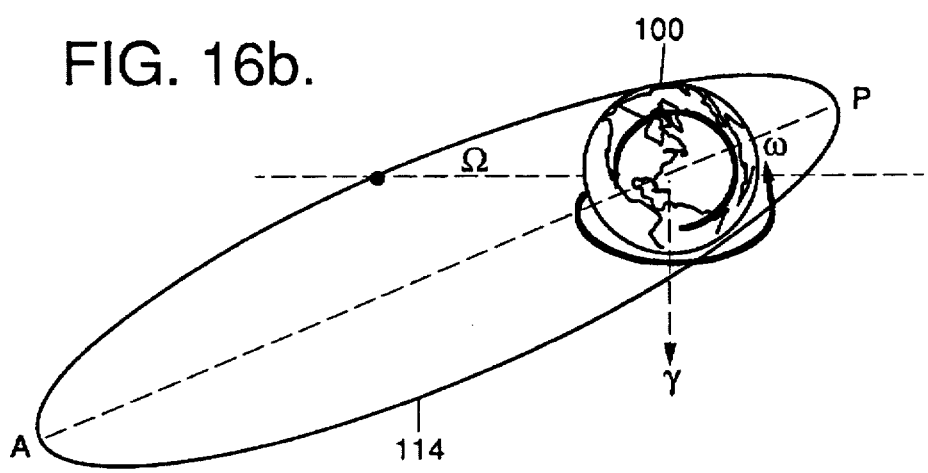

FIGS. 16a and 16b are perspective and plan views of the injection orbit 114 about the earth 100. In general, an orbit is completely defined by five parameters: semi-major axis (sma), eccentricity (ecc), inclination (i), right ascension of ascending node ($\Omega$) and argument of perigee ($\omega$). The sma is the average of the apogee (A) and perigee (P). The ecc is the difference of the apogee and perigee divided by their sum, and is a measure of the "roundness" of the orbit. The inclination is the angle between the plane of the orbit and a reference plane. The node is the angle from a reference vector ($\gamma$), commonly known as Aries (vernal equinox), in the Earth Centered Inertial (ECI) coordinate system, to the point where the ascending orbit intersects the reference plane. The argument of perigee is the angle from the ascending node to perigee.

As discussed above, the sma, ecc and i parameters are selected in accordance with the launch vehicle, payload and the desired final orbit. The node and argument of perigee parameters are selected so that the injection and transfer orbits create moments that substantially offset a moment created by adjusting the satellite's inertial attitude. As a result, the satellite maintains a stable orbit while remaining synchronized to the sun.

Figure 17:
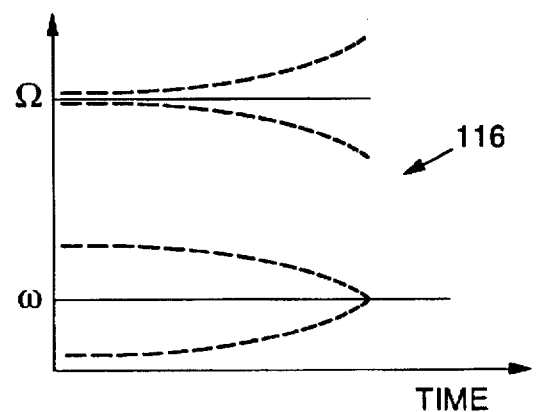
FIG. 17 is a plot of the node and argument of perigee parameters for the particular injection orbit.

FIG. 17 is a plot 116 of the node ($\Omega$) and argument of perigee ($\omega$) over a time of delivery (ToD) to the final orbit for a given inertial attitude adjustment. The dashed lines indicate ($\omega$, $\Omega$) pairs which create moments that do not balance the moment created by the attitude adjustment. This destabilizes the orbit, which changes the values for ($\omega$, $\Omega$) over time. The solid line indicates the ($\omega$,$\Omega$) pair that stabilizes the orbit and thus, maintains substantially constant ($\omega$, $\Omega$) values over the ToD. In the inertially fixed attitude transfer strategy, an argument of perigee of either 0° or 180° would provide a naturally stable orbit. In the adjusted inertial attitude strategy, the argument of perigee is offset from 0° or 180° to cancel the other moment.

A simulation of the satellite's orbit is used to generate plot 116. Although complex, simulations that incorporate the relative motions of the sun, earth, and orbiting satellite are well known. The known parameters such as the initial apogee, perigee, eccentricity, and inclination, the sma of the final orbit, and the adjustment rate of the inertial attitude, are specified. The ($\omega$, $\Omega$) pair is then determined by first selecting the desired sun angle, e.g. preferably 0° for a 3-axis cubic and 90° for a spinner. The desired sun angle and ($\gamma$) determine the value of the node. As a result, the argument of perigee is the only remaining variable. A value of the argument of perigee is selected and corrected until both the node and the argument of perigee remain constant over the ToD.

Although the desired sun angle is preferably 0° for a 3-axis cubic and 90° for a spinner, most applications will allow variation from the preferred angle within some tolerance. This reduces power efficiency and uniformity but increases the stability of the orbit. As a result, the ($\omega$, $\Omega$) pair become less sensitive and thus easier to select.

Figure 18A:
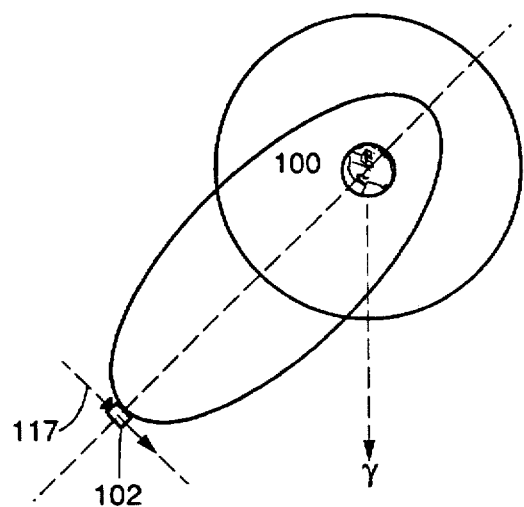
FIGS. 18a through 18d depict the injection, transfer and final orbits in which the inertial attitude is synchronized to the sun.

FIGS. 18a through 18d illustrate the alternate orbit transfer strategy from injection to final orbit for the 3-axis cubic satellite 102. This same strategy applies equally to the spinner satellite. Referring to FIG. 18a, satellite 102 is shown in injection orbit 114 around the earth 100 with its solar panels 106 deployed in a fixed position. The 3-axis cubic satellite preferably spins around its central axis 117 which points towards the sun 104.

Figure 18B:
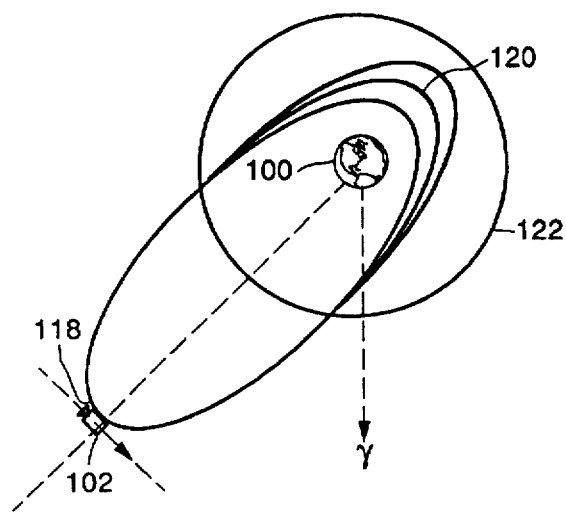

As shown, injection orbit 114 has a particular ($\omega$, $\Omega$) pair selected to maintain orbit stability throughout the transfer orbit. Referring to FIG. 18b, when satellite 102 is at apogee 118, the controller activates the electric propulsion thruster causing a change in velocity vector $\Delta V$ and raising perigee 120 to a new perigee 120 of a new intermediate elliptical orbit 114. This raises the semi-major axis to be substantially equivalent to the semi-major axis of the final orbit 122 so that the orbital periods of the transfer and final orbits are substantially equivalent as well. As shown the final orbit 122 is circular, e.g., geo, meo or leo synchronous.

As described above in FIG. 7, firing the electrical propulsion thrusters at apogee also enables adjustment of the angle of inclination of the orbital plane of the injection orbit 114 with respect to the reference plane of the earth. Ideally the rate of change of the angle of inclination i and of the increase of perigee 120 is such that the angle of inclination i reaches zero degrees and the semi-major axis of the intermediate orbit reaches the semi-major axis of the final orbit 122 at substantially the same time.

Figure 18C:
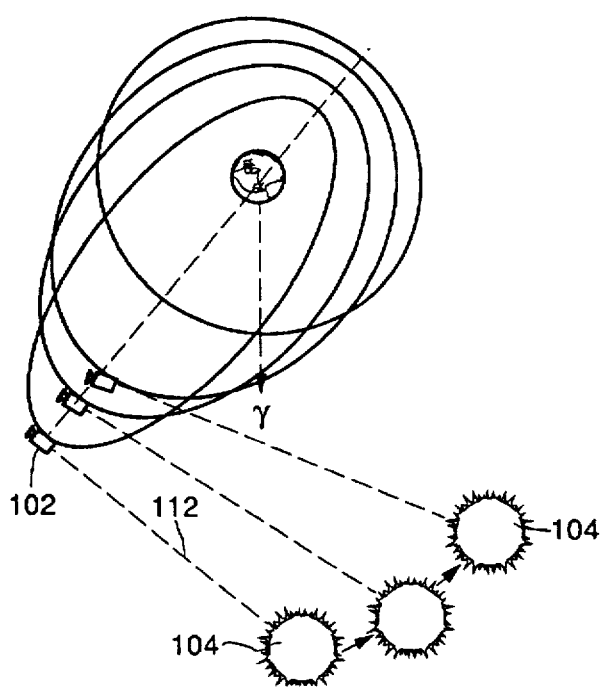

In FIG. 18c, after perigee 122 of transfer orbit 114 has been raised to the predetermined level, the satellite is oriented in the final orbital plane with a desired inertial attitude 112 so that when the controller activates the propulsion thruster a thrust component parallel to $\Delta V$ results. Satellite 102 remains in the final orbital plane while orbiting around the earth 100, and adjusts its inertial attitude so that solar panels 106 maintain a desired angle to the sun 104. The satellite's inertial attitude is preferably adjusted in one of two ways. First, the controller fires the electric propulsion thrusters 50 shown in FIG. 3 to produce an approximately instantaneous unbalanced thrust at the same point in successive orbits. For example, the thrusters can be fired at successive apogees to produce a 1° per day adjustment. Second, the momentum wheels 124 shown in FIG. 3 can be programmed to provide a constant inertial adjustment equivalent to 1° per day.

Figure 18D:
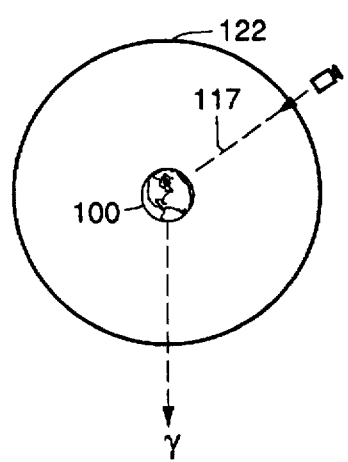

While orbiting the earth, the controller fires electric propulsion thrusters around the entirety of the intermediate orbits 114. This continuous firing has two effects on the transfer orbits 114. First, each succeeding transfer orbit has a progressively higher perigee 120 and a progressively lower apogee 118. Second, at the same time, the eccentricity of the successive orbital ellipses decreases as satellite 102 approaches the eccentricity of the final orbit 114. Once in geosynchronous orbit 122 as shown in FIG. 18d, the satellite 102 may be reoriented into an operational orientation. For example, as shown in FIG. 18d, satellite 102 is positioned with its central axis 117 oriented towards the earth 100.

Although the invention has been described with particular reference to certain preferred embodiments thereof, variations and modifications can be effected within the spirit and scope of the following claims. For example, the orbit transfer strategies can be applied to elliptical final orbits as well as circular orbits.

I claim:

1. A method for launching a spacecraft into a final synchronous orbit about a central body which orbits about a sun, said final orbit having a semi-major axis and an eccentricity, comprising:

injecting said spacecraft into an initial elliptical orbit about the central body and having an inertial attitude, said injection orbit being inclined with respect to a reference plane of said central body and being defined by an apogee, a perigee, a node that is the angle measured from a reference vector to the point where the ascending orbit intersects the reference plane, and an argument of perigee that is the angle from the node to perigee;

adjusting the perigees of successive intermediate orbits until their semi-major axis is substantially equal to the semi-major axis of the final orbit;

continuously providing thrust to change the eccentricity of the intermediate orbit to that of said final orbit while maintaining the substantial equality of the final semi-major axis and the intermediate orbit semi-major axis; and adjusting the inertial attitude of the spacecraft to maintain, within a tolerance, a selected orientation of the spacecraft to the sun, said node and argument of perigee being selected to create an orbit moment that opposes a moment produced by adjusting the inertial attitude so that said node and argument of perigee remain substantially constant over a time of delivery to the final orbit.

2. The method of claim 1, wherein said spacecraft has a central axis that is oriented with said inertial attitude and has solar panels, the method further comprising:

spinning the spacecraft about its central axis thus reducing the complexity of maintaining and adjusting the inertial attitude, which maintains an orientation of the spacecraft's solar panels to the sun to provide an increased and approximately uniform power level.

3. The method of claim 2, wherein said spacecraft is a spinner satellite in which said solar panels are affixed to its outer surface directed away from its central axis and spin around its central axis.

4. The method of claim 3, wherein said spinner satellite's central axis is maintained at an approximately perpendicular orientation to a radius between the sun and the satellite.

5. The method of claim 4, wherein said spacecraft is a 3-axis cubic satellite in which said solar panels are deployed in a fixed position directed towards the sun.

6. The method of claim 5, wherein said 3-axis cubic satellite is maintained approximately in line with a radius between the sun and the satellite.

7. The method of claim 2, wherein the spacecraft includes an electrical propulsion thruster for providing the continuous thrust.

8. The method of claim 7, wherein said electrical propulsion thruster provides art unbalanced thrust pulse during successive orbits to adjust the inertial attitude.

9. The method of claim of claim 7, wherein the spacecraft includes a momentum wheel that continuously adjusts the inertial attitude of the spacecraft.

10. A method for launching a spacecraft into a circular orbit about a central body which orbits about a sun, said circular orbit having a semi-major axis, comprising:

providing a satellite having a central axis, said satellite include solar panels in a known orientation to said central axis, an electrical propulsion thruster for providing thrust along said central axis, and an attitude controller for adjusting the inertial attitude of the satellite's central axis injecting said satellite into an initial supersynchronous elliptical orbit about the central body and having an inertial attitude that orients the solar panels towards the sun, said injection orbit being inclined with respect to a reference plane of said central body and being defined by an apogee, a perigee, a node that is the angle measured from a reference vector to the point where the ascending orbit intersects the reference plane, and an argument of perigee that is the angle from the node to perigee;

spinning the satellite about its central axis to reduce the complexity of maintaining its inertial attitude;

firing the electrical propulsion thruster at apogees of intermediate orbits to successively increase the perigees thereof until their semi-major axis is substantially equal to the semi-major axis of the circular orbit;

continuously firing the electrical propulsion thruster to translate the orbit of the satellite from the intermediate orbit to the circular orbit while maintaining the substantial equality of the circular semi-major axis and the intermediate orbit semi-major axis; and controlling the attitude controller to adjust the inertial attitude of the spacecraft to maintain, within a tolerance, a selected orientation of the spacecraft's solar panels to the sun, to provide an increased and approximately uniform power level;

said node and argument of perigee being selected to create an orbit moment that opposes a moment produced by adjusting the inertial attitude so that said node and argument of perigee remain substantially constant over a time of delivery to the circular orbit.

11. The method of claim 10, wherein said satellite is a spinner in which said solar panels are affixed to its outer surface directed away from its central axis and spin around its central axis.

12. The method of claim 11, wherein said spinner satellite's central axis is maintained at an approximately perpendicular orientation to a radius between the sun and the satellite so that its solar panels face the sun.

13. The method of claim 10, wherein said satellite is a 3-axis cubic satellite in which said solar panels are deployed in a fixed position directed towards the sun.

14. The method of claim 13, wherein said 3-axis cubic satellite is maintained approximately in line with a radius between the sun and the satellite.

15. The method of claim 10, wherein said attitude controller comprises the electrical propulsion thruster which provides an unbalanced thrust pulse during successive orbits to adjust the inertial attitude.

16. The method of claim of claim 10, wherein the attitude controller comprises a momentum wheel that continuously adjusts the inertial attitude of the spacecraft.

* * * * *